US007920986B2

(12) United States Patent
Vacar et al.

(10) Patent No.: US 7,920,986 B2
(45) Date of Patent: Apr. 5, 2011

(54) SURFACE SHAPE METRIC AND METHOD TO QUANTIFY THE SURFACE SHAPE OF ELECTRONIC PACKAGES

(75) Inventors: Dan Vacar, San Diego, CA (US); David K. McElfresh, San Diego, CA (US); Anton Bougaev, La Jolla, CA (US); Donald A. Kearns, San Diego, CA (US); Charles E. Kinney, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 388 days.

(21) Appl. No.: 12/045,418

(22) Filed: Mar. 10, 2008

(65) Prior Publication Data

US 2009/0228237 A1    Sep. 10, 2009

(51) Int. Cl.
*G01B 5/18* (2006.01)
*G01N 21/86* (2006.01)

(52) U.S. Cl. ................................. 702/166; 250/559.24

(58) Field of Classification Search .................. 702/166, 702/33, 81, 84–86, 94–95, 97, 127, 150, 702/152–153, 155–158, 167, 170, 179, 182–183, 702/189; 33/503–504, 559–560, 645, 700–701; 257/48, 678, 686; 250/559.01, 559.19, 559.24, 559.26, 559.27, 559.29, 559.35, 559.36
See application file for complete search history.

(56) References Cited

U.S. PATENT DOCUMENTS 4,736,108 A * 4/1988 Comstock et al. ....... 250/559.34

OTHER PUBLICATIONS

Beijer et al., Warpage Minimization of the HVQFN Map Mould, 2005, 6th Int. Conf. on Thermal, Mechanical and Multiphysics Simulation and Experiments in Micro-Electronics and Micro-Systems, EuroSimE 2005, pp. 168-174.*

* cited by examiner

*Primary Examiner* — Michael P Nghiem
*Assistant Examiner* — Toan M Le
(74) *Attorney, Agent, or Firm* — Osha • Liang LLP

(57) ABSTRACT

A method of quantifying a shape of a surface includes measuring an elevation (z) of the surface at a plurality of locations in an x-y plane of the surface. The measurement data is fit to a series expansion in terms of one or more base functions that include a series expansion fit. A vector of shape coefficients are calculated from the series expansion fit. A vector of shape coefficients are output.

9 Claims, 9 Drawing Sheets

SURFACE SHAPE METRIC AND METHOD TO QUANTIFY THE SURFACE SHAPE OF ELECTRONIC PACKAGES

BACKGROUND

Electronic component packaging relates to an electrical and/or mechanical package that houses one or more elements that comprise an electronic component. Electronic component packaging plays an important role in the performance and reliability of a computer system. The package serves a number of purposes, including electrical path provisioning for signals and power distribution, thermal paths for heat extraction and cooling, and mechanical protection against undesired internally and externally generated forces.

Conventional electronic component packaging include transistor packages, e.g., small outline transistor ("SOT"), and integrated circuit packages, e.g., small outline integrated circuit ("SOIC"), thin small outline package ("TSOP"), shrink small outline package ("SSOP"), thin shrink small outline package ("TSSOP"), plastic leaded chip carrier ("PLCC"), quarter-size small outline package ("QSOP"), very small outline package ("VSOP"), low profile quad flat pack ("LQFP"), plastic quad flat pack ("PQFP"), ceramic quad flat pack ("CQFP"), thin quad flat pack ("TQFP"), pin grid array ("PGA"), and ball grid array ("BGA").

It is sometimes desirable to stack a number of components as part of the package. For example, Sun Microsystems' high-end server microprocessor module package is comprised of a number of electrical and mechanical components that are mated together electrically and/or mechanically. With reference to FIG. 1, the high-end server microprocessor module package 100 is comprised of one or more screws 105, one or more springs 110, a heat sink 115, one or more bushings 120, a thermal interface 125, a microprocessor package 140 comprised of one or more semiconductor die 130 mounted on a ceramic substrate 135, a socket 145, a printed circuit board 150, an electrical insulating interface 155, and a bolstering plate 160. The interface between 140 and 150 is often referred to as the L2 interface. To ensure the functionality and reliability of the module package, it is necessary to precisely control the surface shape of each component in the stack.

The overall shape of the module package is determined by the interplay of relative stresses between the components that comprise the stack. The relative stresses at each interface depend on the intrinsic properties of the material and are typically temperature dependent. For example, one component might have a coefficient of thermal expansion that is different from that of another component to which it is mated. As a result, the surface shape will change when two or more components with different coefficients of thermal expansion are mated and thermal expansion or contraction takes place. Thus, it is critical to characterize the surface shape of the components before they are assembled into the module package as well as to characterize the surface shape of the resulting module package.

EQ. 1 represents the commonly used surface shape parameter that is utilized in industry to describe the surface shape of a package.

$$\text{Warpage} = z_{max} - z_{min} \quad (1)$$

The warpage parameter, also known as co-planarity or flatness, is defined as the difference between the maximum and minimum surface elevation (z-coordinate) of the package when placed on a horizontal seating plane (z=0).

The Joint Electron Device Engineering Council ("JEDEC") has promulgated a number of standards that relate to the measurement of coplanarity using the warpage parameter, such as JEDEC Standard No. 22-B108A entitled "Coplanarity Test for Surface-Mount Semiconductor Devices" and JEDEC Standard No. 22-B112 entitled "High Temperature Package Warpage Measurement Methodology." Conventional metrology utilizing the warpage parameter typically assumes that the surface shape is spherically symmetric. Any deviation from that assumption is typically treated as tolerance or margin in the warpage.

FIG. 2 shows a topographic or contour map of the surface shape of a package with spherical symmetry. The x-axis 210 and y-axis 220 represent the dimensions of the electronic component in the direction of the x-axis 210 and the y-axis 220 measured in units of millimeters. The z-axis is represented by a color coded scale 230 that represents the elevation of the electronic component from the horizontal seating plane in units of micrometers (μm). With respect to FIG. 2, the centermost countour 240 represents a 50 μm elevation from the horizontal seating plane.

However, there are a number of more complex surface shapes encountered in practice. FIG. 3 shows a topographic or contour map of the surface shape of a package with axial symmetry of the cylindrical type. The x-axis 310 and y-axis 320 represent the dimensions of the electronic component in the direction of the x-axis 310 and y-axis 320 measured in units of millimeters. The z-axis is represented by a color coded scale 330 that represents the elevation of the electronic component from the horizontal seating plane in units of micrometers. With respect to FIG. 3, the centermost countour 340 represents a 50 μm elevation from the horizontal seating plane. Note that, in contrast to the spherically symmetric surface shape shown in FIG. 2, the 50 μm elevation shown in FIG. 3 is a region that extends the entire length of the y-axis 320 centered with respect to the x-axis 310.

FIG. 4 shows a topographic or contour map of the surface shape of a package with axial symmetry of the saddle type. The x-axis 410 and y-axis 420 represent the dimensions of the electronic component in the direction of the x-axis 410 and y-axis 420 measured in units of millimeters. The z-axis is represented by a color coded scale 430 that represents the elevation of the electronic component from the horizontal seating plane in units of micrometers. With respect to FIG. 4, the surface shape exhibits what is referred to as saddle symmetry. The upper portion 440 and lower portion 450 of the saddle represent a 50 μm elevation from the horizontal seating plane.

As shown above, FIG. 2, FIG. 3, and FIG. 4 represent the surface shape of a package with spherical symmetry, axial symmetry of the cylindrical type, and axial symmetry of the saddle type respectively. Note that each of FIG. 2, FIG. 3, and FIG. 4 exhibit symmetry with respect to the x-axis 210, 310, 410 and the y-axis 220, 320, 420. However, surface shapes are often twisted due to the interplay between surfaces that are mated electrically and/or mechanically or inadvertent non-uniform stress induced as part of the fabrication process of a component.

FIG. 5 shows a topographic or contour map of the surface shape of a package with twisted spherical symmetry. The x-axis 510 and y-axis 520 represent the dimensions of the electronic component in the direction of the x-axis 510 and the y-axis 520 measured in units of millimeters. The z-axis is represented by a color coded scale 530 that represents the elevation of the electronic component from the horizontal seating plane in units of micrometers. With respect to FIG. 5, the surface shape, that originally had spherical symmetry, is twisted, meaning that the elevation from the horizontal seating plane is twisted in the direction of the lower left corner of the electronic component package. Thus, the lower left corner 540 represents a 50 µm elevation from the horizontal seating plane.

FIG. 6 shows a topographic or contour map of the surface shape of a package with twisted axial symmetry of the cylindrical type. The x-axis 610 and y-axis 620 represent the dimensions of an electronic component in the direction of the x-axis 610 and the y-axis 620 measured in units of millimeters. The z-axis is represented by a color coded scale 630 that represents the elevation of the electronic component from the horizontal seating plane in units of micrometers. With respect to FIG. 6, the surface shape, that originally had axial symmetry of the cylindrical type, is twisted, meaning that the elevation from the horizontal seating plane is twisted in the direction of the lower left corner of the electronic component package. Thus, the lower left corner 640 represents a 50 µm elevation from the horizontal seating plane.

FIG. 7 shows a topographic or contour map of the surface shape of a package with twisted axial symmetry of the saddle type. The x-axis 710 and y-axis 720 represent the dimensions of the electronic component in the direction of the x-axis 710 and y-axis 720 measured in units of millimeters. The z-axis is represented by a color coded scale 730 that represents the elevation of the electronic component from the horizontal seating plane in units of micrometers. With respect to FIG. 7, the surface shape exhibits saddle symmetry twisted in the direction of the lower left corner of the electronic component package. Thus, the lower portion 740 of the saddle represents a 50 µm elevation from the horizontal seating plane.

One of ordinary skill in the art will recognize that there are a number of other surface shapes realized in practice that deviate from spherical symmetry.

SUMMARY

According to one aspect of one or more embodiments of the present invention, a method for quantifying a shape of a surface comprising: measuring an elevation (z) of the surface at a plurality of locations in an x-y plane of the surface comprising measurement data; performing a fit of the measurement data to a series expansion in terms of one or more base functions comprising a series expansion fit; calculating a vector of shape coefficients from the series expansion fit; and outputting the vector of shape coefficients.

According to one aspect of one or more embodiments of the present invention, an apparatus for quantifying a shape of a surface comprising: means for measuring elevation (z) of the surface at a plurality of locations in an x-y plane of the surface comprising measurement data; means for performing a fit of the measurement data to a series expansion in terms of one or more base functions comprising a series expansion fit; means for calculating a vector of shape coefficients from the series expansion fit; and means for outputting the vector of shape coefficients.

According to one aspect of one or more embodiments of the present invention, a computer readable medium comprising computer executable software instructions which, when executed by a processor, performs a method comprising: measuring an elevation (z) of a surface at a plurality of locations in an x-y plane of the surface comprising measurement data; performing a fit of the measurement data to a series expansion in terms of one or more base functions comprising a series expansion fit; calculating a vector of shape coefficients from the series expansion fit; and outputting the vector of shape coefficients.

According to one aspect of one or more embodiments of the present invention, a method for quantifying a shape of a surface comprising: identifying a target shape for the surface; measuring the elevation (z) of the surface at a plurality of locations in the x-y plane of the surface comprising measurement data; defining a residual surface as the difference between the measurement data and the target surface; performing a fit of the residual surface to a series expansion in terms of one or more base functions comprising a series expansion fit; calculating a vector of shape coefficients from the series expansion fit; and outputting the vector of shape coefficients.

Other aspects of the present invention will be apparent from the following description and the appended claims.

DETAILED DESCRIPTION

Figure 1:
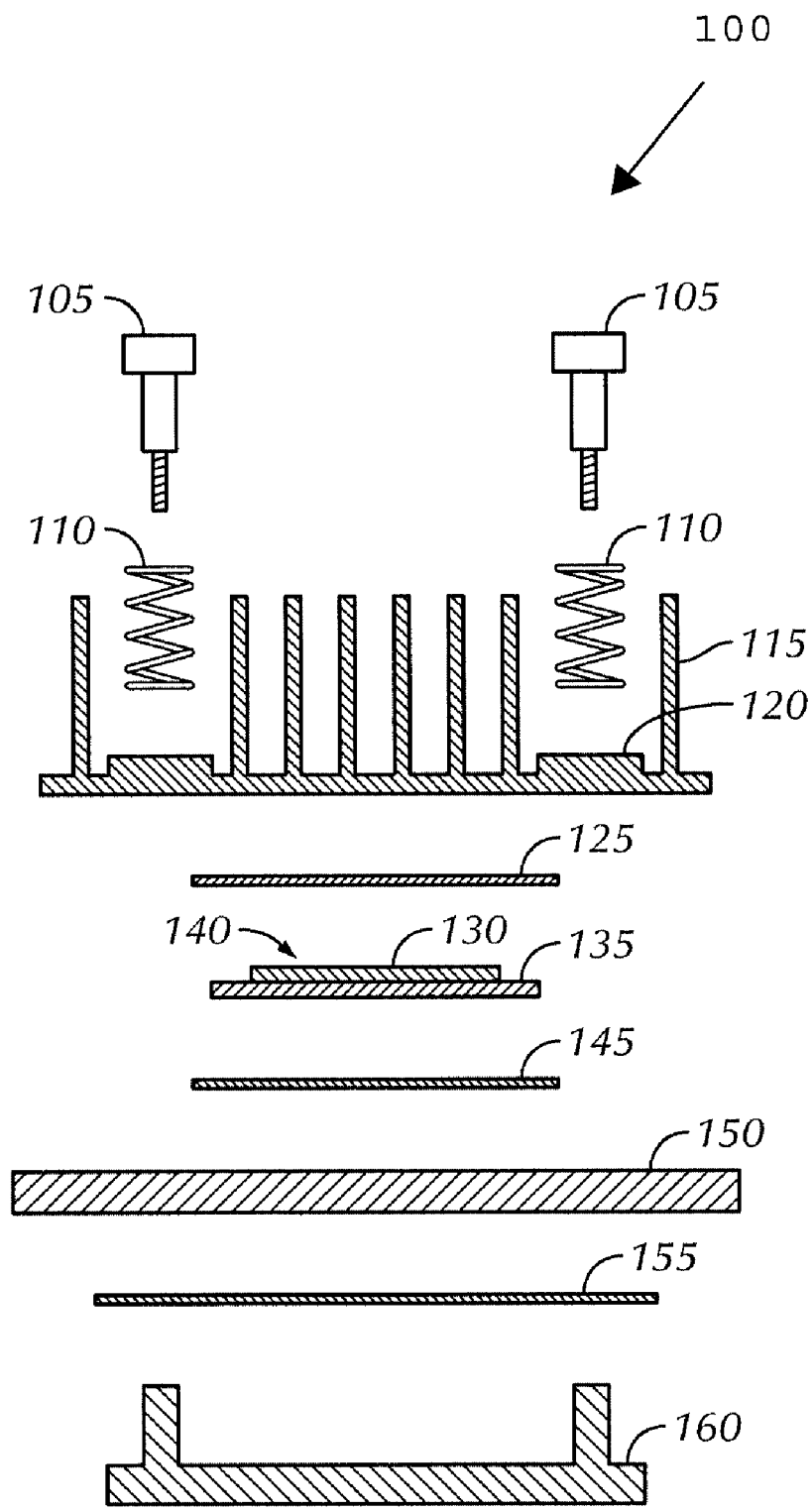
FIG. 1 shows a cross-section of a Sun Microsystems' high-end server microprocessor module package.
Figure 2:
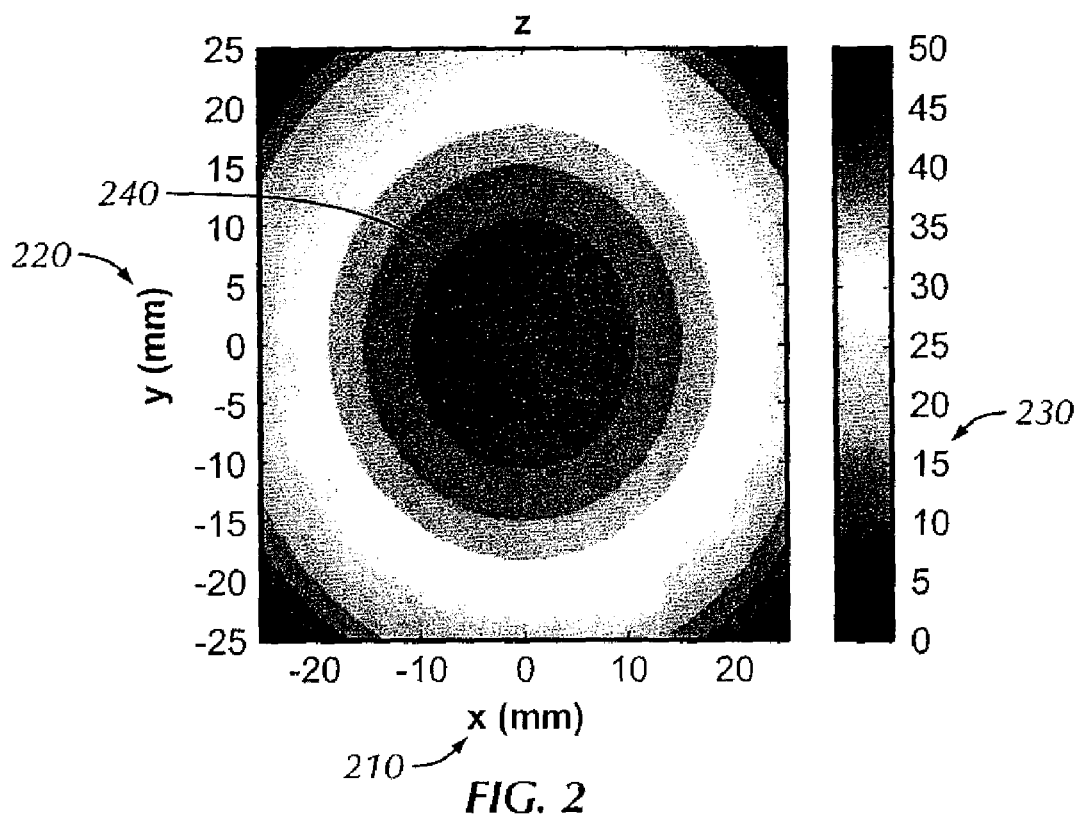
FIG. 2 shows a topographic or contour map of the surface shape of an electronic component with spherical symmetry.
Figure 3:
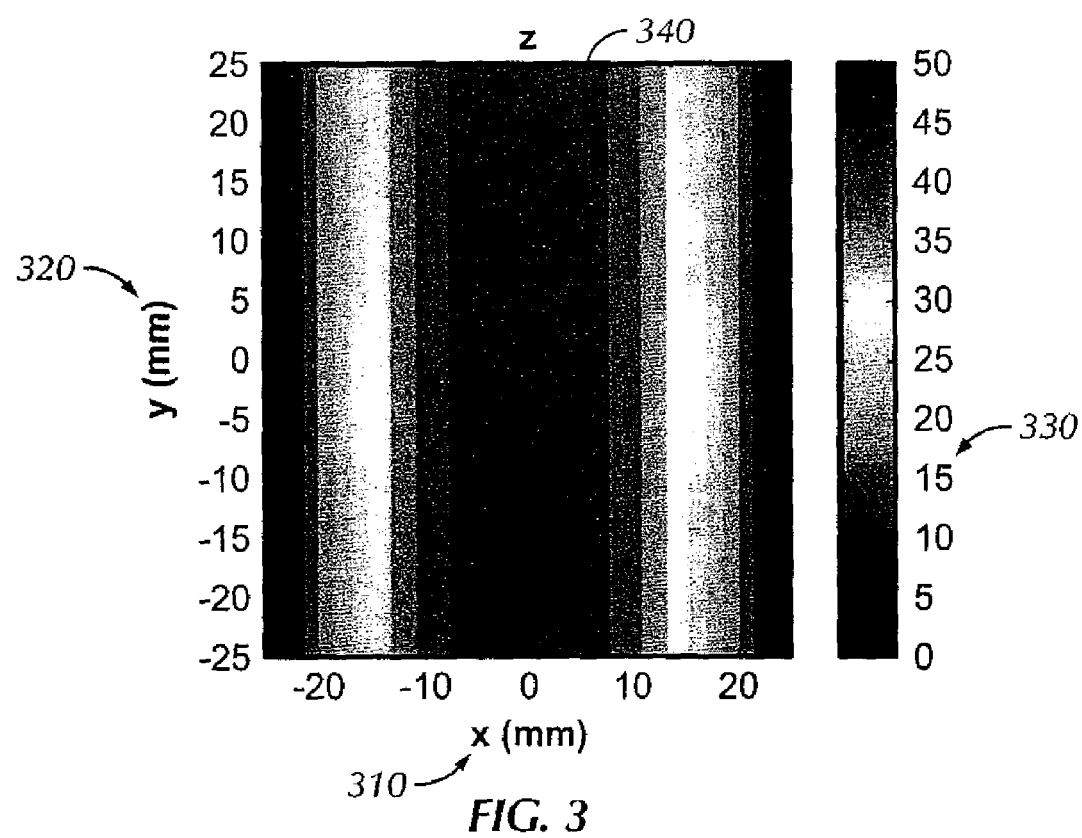
FIG. 3 shows a topographic or contour map of the surface shape of an electronic component with axial symmetry of the cylindrical type.
Figure 4:
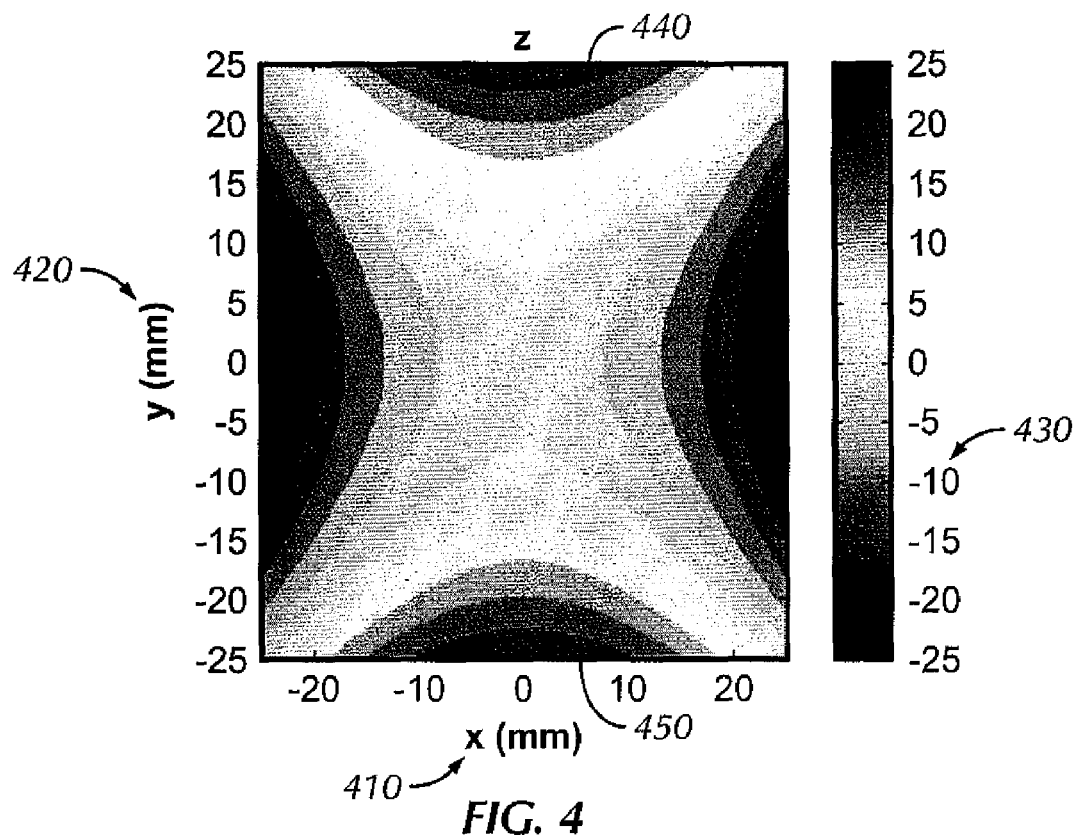
FIG. 4 shows a topographic or contour map of the surface shape of an electronic component with axial symmetry of the saddle type.
Figure 5:
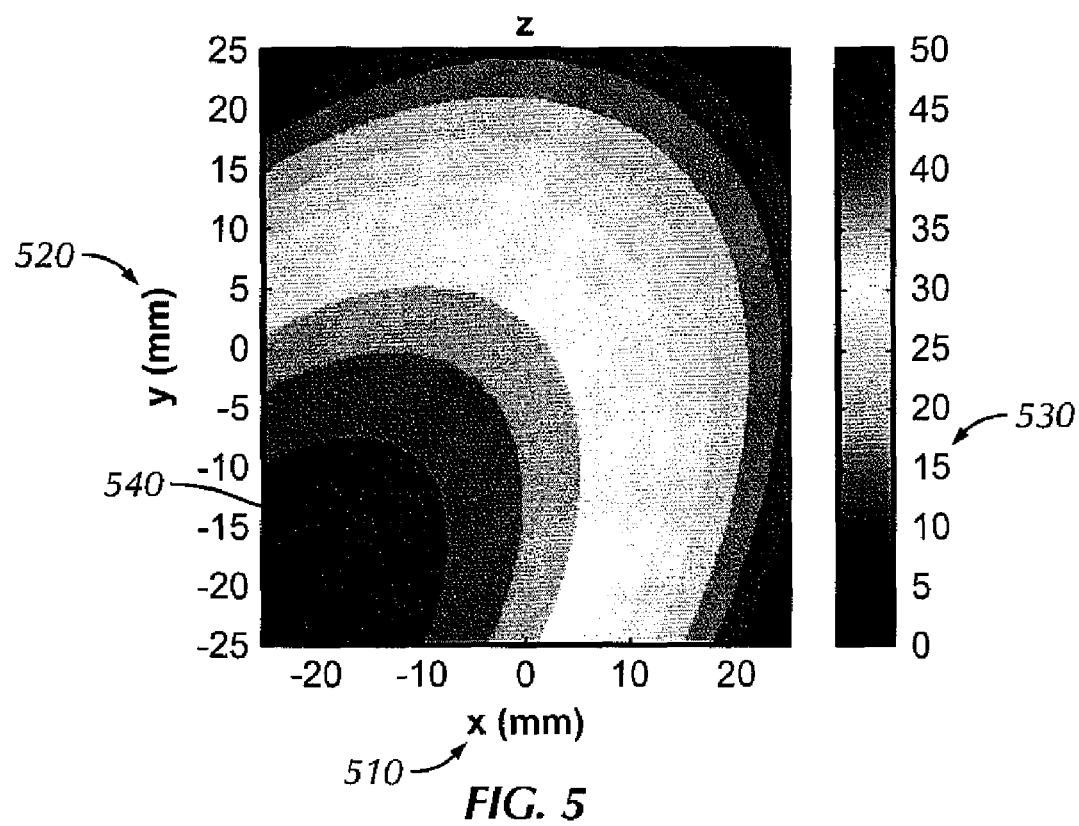
FIG. 5 shows a topographic or contour map of the surface shape of an electronic component with twisted spherical symmetry.
Figure 6:
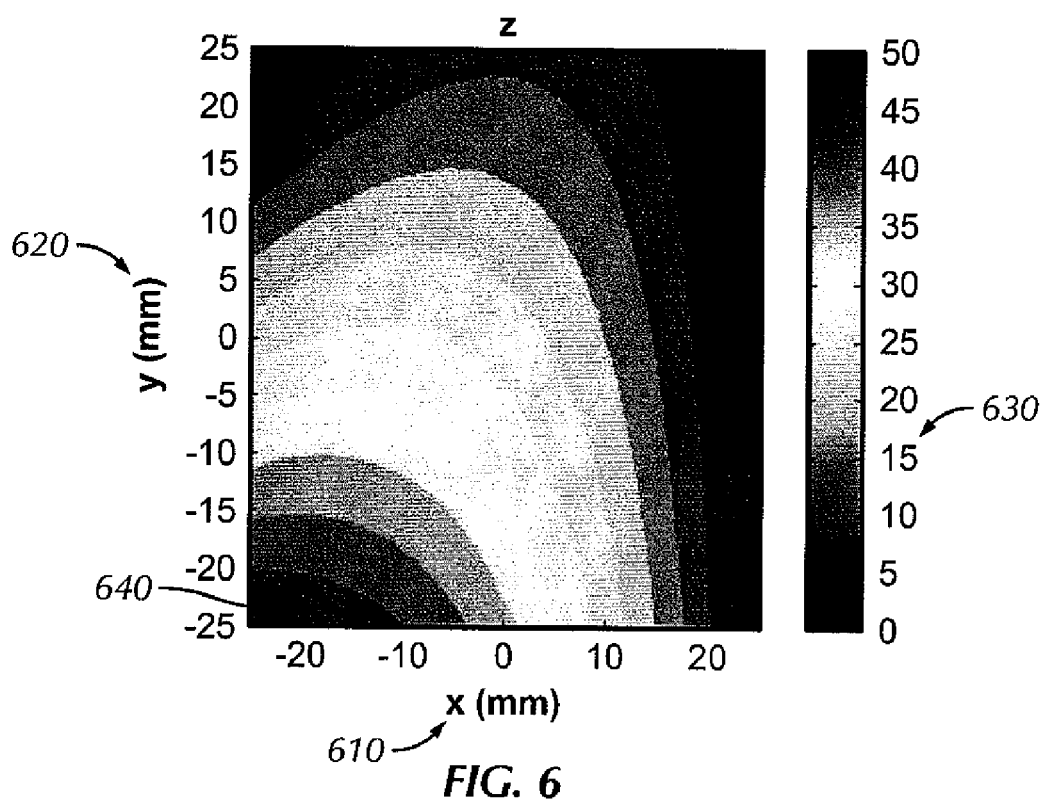
FIG. 6 shows a topographic or contour map of the surface shape of an electronic component with twisted axial symmetry of the cylindrical type.
Figure 7:
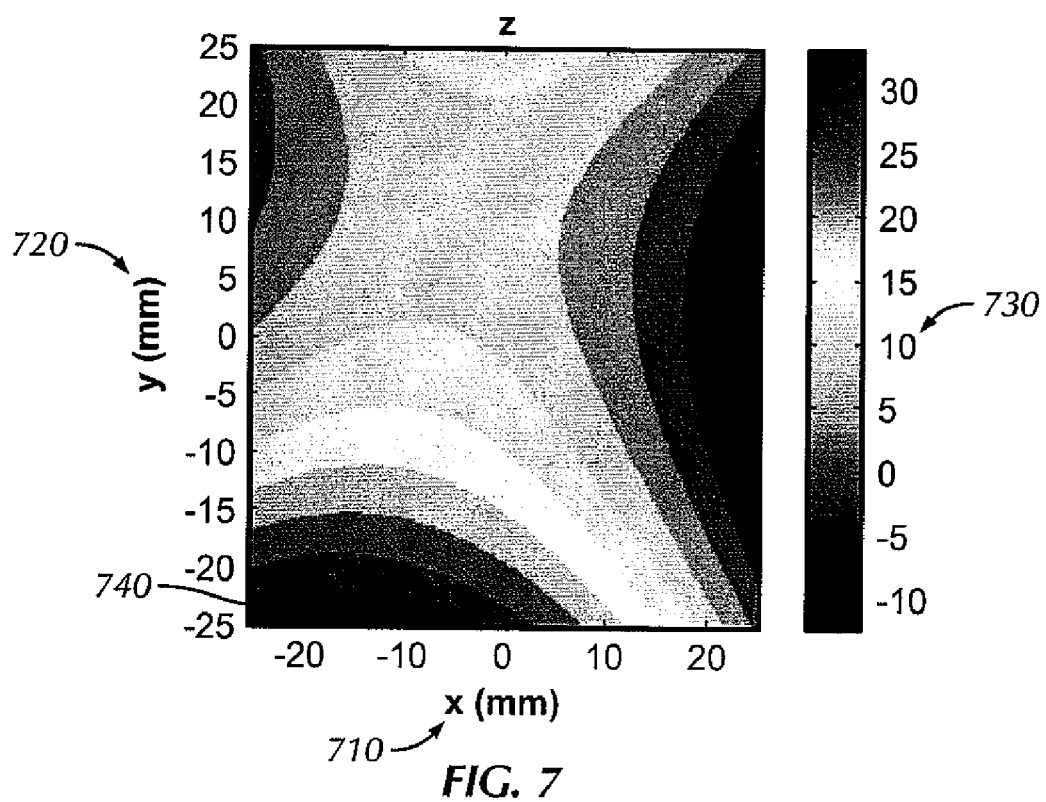
FIG. 7 shows a topographic or contour map of the surface shape of an electronic component with twisted axial symmetry of the saddle type.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

FIG. 1 shows a cross-section of Sun Microsystems' high-end server microprocessor module.

The Sun Microsystems' high-end server microprocessor module package is comprised of a number of electrical and mechanical components that are mated together electrically and/or mechanically. The high-end server microprocessor module package 100 is comprised of one or more screws 105, one or more springs 110, a heat sink 115, one or more bushings 120, a thermal interface 125, a microprocessor package 140 comprised of one or more semiconductor die 130 mounted on a ceramic substrate 135, a socket 145, a printed circuit board 150, a Mylar® interface 155, and a bolstering plate 160. As previously noted, it is necessary to precisely control the surface shape of each component in the stack to ensure the functionality and reliability of the module package.

Figure 8:
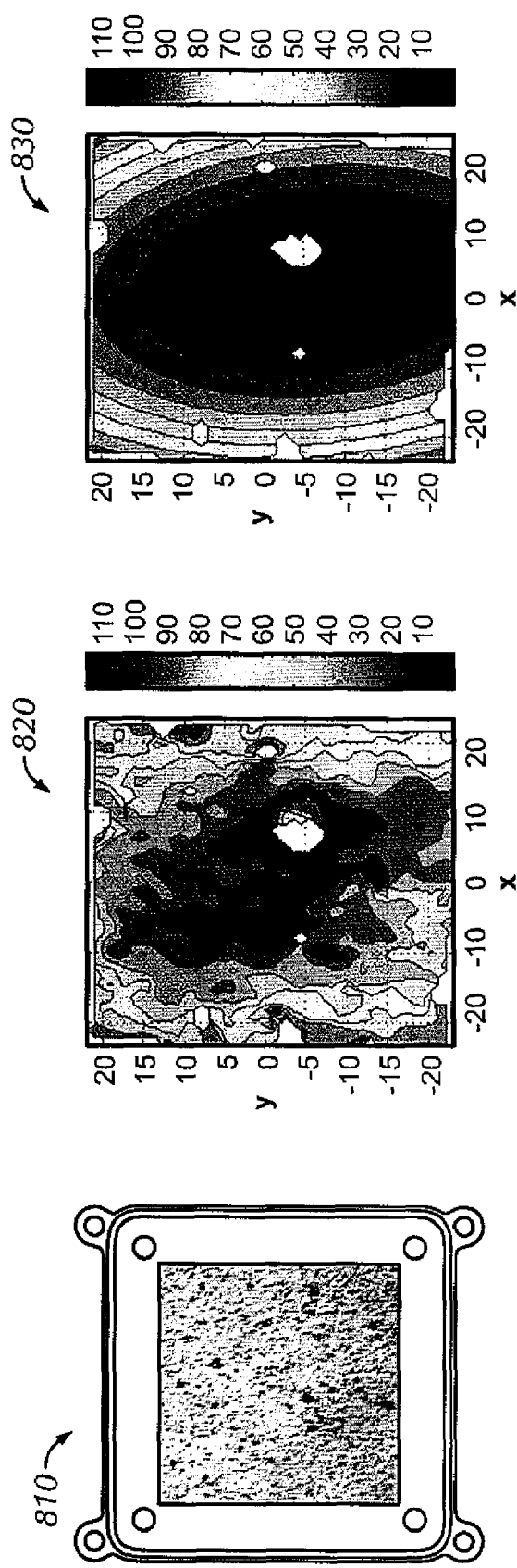
FIG. 8 shows a surface shape to be quantified (high-end server microprocessor module), a contour map representing the raw measurement data, and a contour map representing the surface shape after performing a quadratic fit to the raw measurement data in accordance with one or more embodiments of the present invention.

FIG. 8 shows the connector side of the high-end server microprocessor module, which represents a surface shape to be quantified, a contour map representing raw measurement data of the surface shape, and a contour map representing the surface shape after performing a quadratic fit to the raw measurement data in accordance with one or more embodiments of the present invention.

The connector side of the high-end server microprocessor module 805 represents a surface shape to be quantified. The surface can be represented as a three-dimensional shape where the x-axis 810 and y-axis 815 represent a plane and the z-axis 820 represents elevation of the surface from the plane. With reference to EQ. 2, raw measurement data representing elevation of the surface at a specific co-ordinate is obtained through conventional metrology.

$$z = z(x,y) \quad (2)$$

The raw measurement data, representing the elevation of the surface shape at a plurality of measurement points on the x-axis 810 and y-axis 815, is measured and stored. The scale for the elevation of the surface shape is typically in the range of micrometers, where a positive number represents elevation from the seating plane of the surface and a negative number represents depth below the seating plane of the surface. As such, a perfectly flat surface is one in which $z(x,y)=0$ for all x and y. The raw measurement data is typically limited to a finite number of measurement points on the plane created by the x-axis 810 and y-axis 815. The raw measurement data can be plotted as a contour map 825 representing the surface shape.

The raw measurement data may be used to perform a series decomposition. With reference to EQ. 3, a series expansion fit may represent a fitted elevation of the surface.

$$z_{fit}(x, y) = \sum_{mn} a_{mn} F_{mn}(x, y) \quad (3)$$

The function $F_{mn}(x,y)$ represents a complete and unitary set of base functions (primitives, wavelets) defined on the package surface. The choice of base functions depends on the appropriate boundary conditions applicable to the package surface under consideration. Examples of such base functions include the modes of a vibrating membrane with fixed or free edges and the natural modes of a rectangular plate with unconstrained edges. The vector $a_{mn}$ represents a set of surface shape coefficients that are estimated through an appropriate numerical method that is dependent on the choice of base functions. For example, least-squares regression may be used.

In one or more embodiments of the present invention, the base functions may be generalized monomials as shown in EQ. 4.

$$F_{mn}(x,y) = x^m y^n \quad (4)$$

With respect to EQ. 5 and EQ. 6, the indices m and n may be constrained.

$$m, n \in \{0,1,2\} \quad (5)$$

$$m+n \leq 2 \quad (6)$$

If only terms that satisfy EQ. 5 and EQ. 6 are retained, the series expansion fit results in a quadratic polynomial such as a generalized paraboloid.

With reference to EQ. 7, the quadratic polynomial represents the fitted elevation of the surface in terms of the planer co-ordinates, x and y, and six coefficient terms, A, B, C, D, E, and F.

$$z_{fit}(x,y) = Ax^2 + By^2 + Cxy + Dx + Ey + F \quad (7)$$

In order to solve for the six coefficient terms of the generalized paraboloid, the raw measurement data must be comprised of at least six measurement points. A system of linear equations can be formed by at least six equations in which at least six measurement points are utilized. As such, the resulting system of linear equations is linear in the six coefficient terms, which are the only unknowns. The system of linear equations can then be solved to determine the value of the six coefficient terms. One of ordinary skill in the art will recognize that there are a number of different ways in which the raw measurement data can be fitted to the generalized paraboloid and in which the six coefficient terms can be determined. Referring again to FIG. 8, the fitted data can be plotted as a contour map 830 representing the surface shape.

Figure 9:
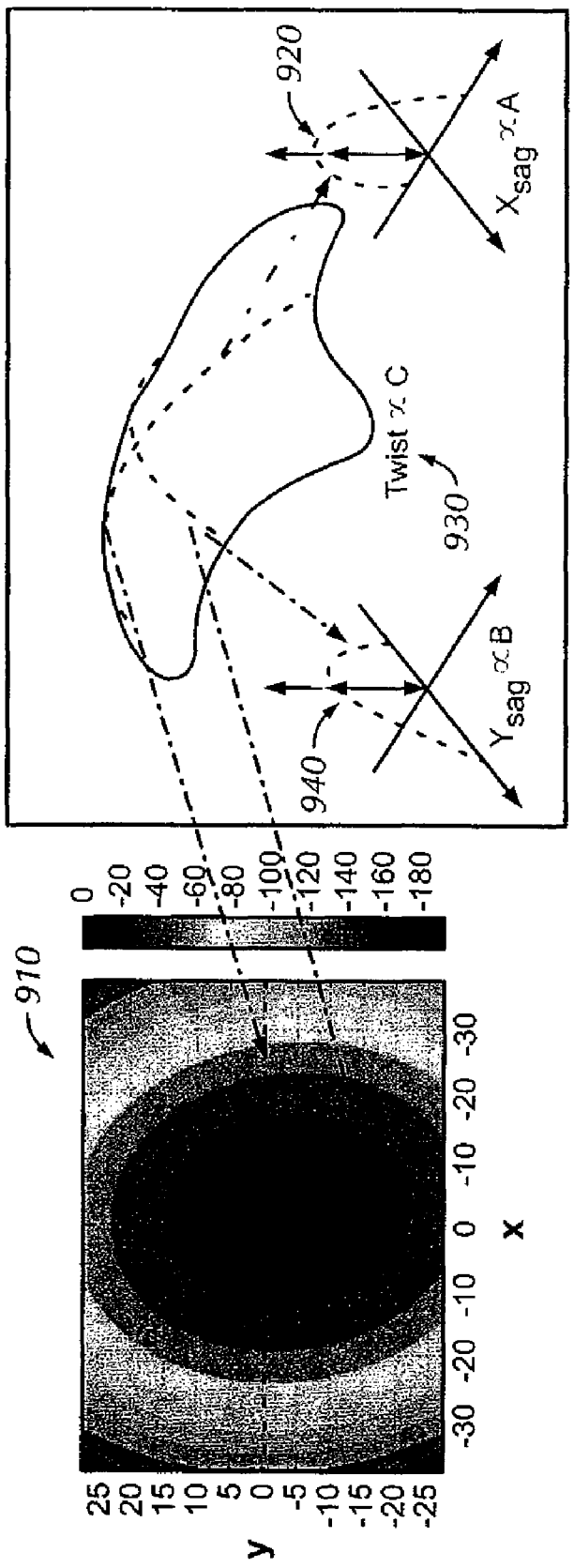
FIG. 9 shows a contour map representing a surface shape and calculated intrinsic surface shape parameters $X_{sag}$, $Y_{sag}$, and Twist in accordance with one or more embodiments of the present invention.

Once the six coefficient terms have been determined in accordance with EQ. 7, a set of intrinsic surface shape parameters can be calculated. FIG. 9 shows a contour map 905 representing a surface shape and calculated intrinsic surface shape parameters $X_{sag}$ 910, $Y_{sag}$ 915, and Twist 920 in accordance with one or more embodiments of the present invention. The intrinsic surface shape parameters provide a set of quantifiable parameters that can effectively describe the surface shape of a given package. The intrinsic surface shape parameters are calculated from the coefficients of EQ. 7 and the planar dimensions of the surface, $L_x$ and $L_y$, corresponding to the length of the surface in the direction of the x-axis and the length of the surface in the direction of the y-axis respectively.

With reference to EQ. 8, the parameter $X_{sag}$ is calculated.

$$X_{sag} = -\frac{AL_x^2}{4} \quad (8)$$

The coefficient A is the coefficient of the quadratic term in x from EQ. 7 and represents the elevation of the surface in the direction of the x-axis. $L_x$ represents the length of the surface in the direction of the x-axis.

With reference to EQ. 9, the parameter $Y_{sag}$ is calculated.

$$Y_{sag} = -\frac{BL_y^2}{4} \quad (9)$$

The coefficient B is the coefficient of the quadratic term in y from EQ. 7 and represents the elevation of the surface in the direction of the y-axis. $L_y$ represents the length of the surface in the direction of the y-axis.

With reference to EQ. 10, the parameter Twist is calculated.

$$\text{Twist} = -\frac{CL_xL_y}{4} \quad (10)$$

The coefficient C is the coefficient of the cross-term in x and y from EQ. 7 and represents the elevation of the fourth corner with respect to a seating plane that contains the other three corners. $L_x$ represents the length of the surface in the direction of the x-axis. $L_y$ represents the length of the surface in the direction of the y-axis.

The linear terms of EQ. 7, coefficients D and E, describe the tilt of the surface. The constant term of EQ. 7, coefficient F, describes the piston of the surface.

Figure 10:
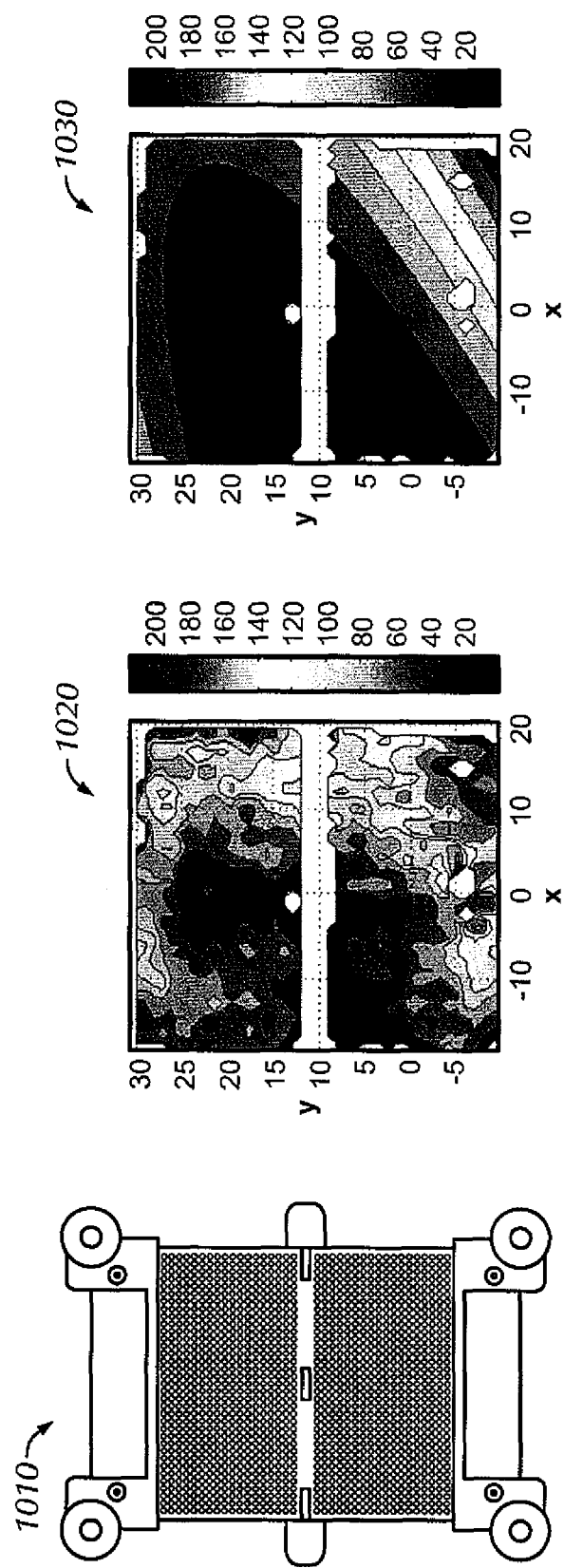
FIG. 10 shows a surface shape to be quantified (industry standard BGA socket), a contour map representing the raw measurement data, and a contour map representing the surface shape after performing a quadratic fit to the raw measurement data in accordance with one or more embodiments of the present invention.

For purposes of illustration, FIG. 10 shows a surface shape to be quantified (industry standard BGA socket), a contour map representing the raw measurement data, and a contour map representing the surface shape after performing a quadratic fit to the raw measurement data in accordance with one or more embodiments of the present invention.

Figure 11:
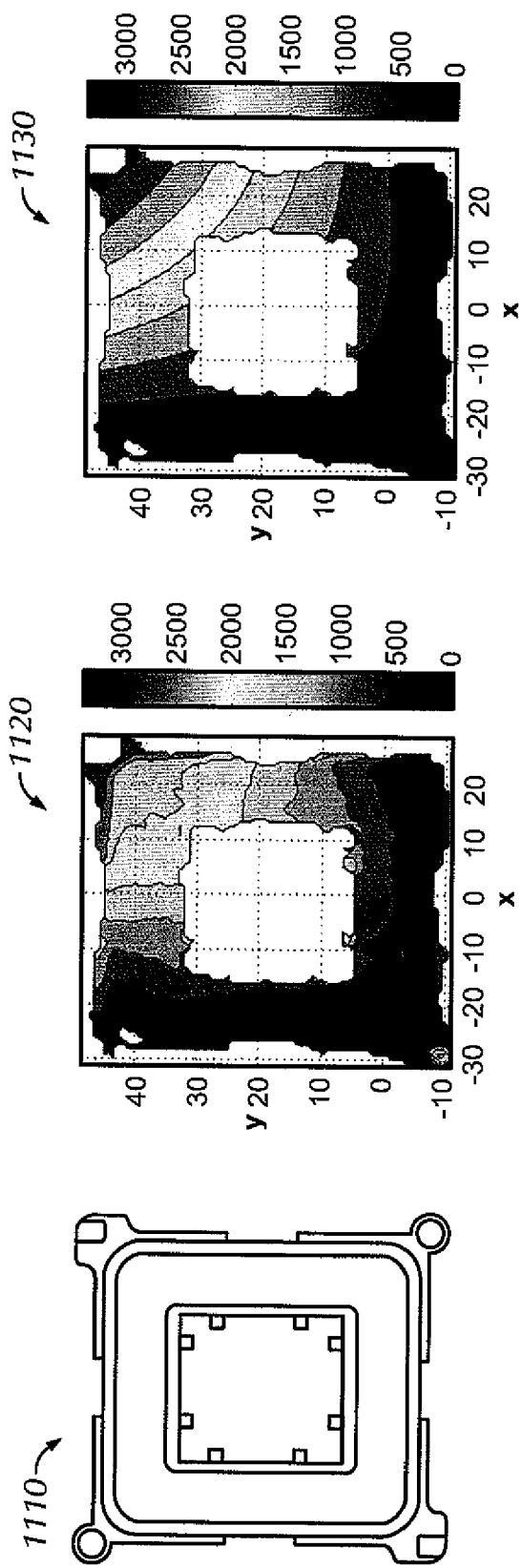
FIG. 11 shows a surface shape to be quantified (PGA connector), a contour map representing the raw measurement data, and a contour map representing the surface shape after performing a quadratic fit to the raw measurement data in accordance with one or more embodiments of the present invention.

Again, for purposes of illustration, FIG. 11 shows a surface shape to be quantified (PGA connector), a contour map representing the raw measurement data, and a contour map representing the surface shape after performing a quadratic fit to the raw measurement data in accordance with one or more embodiments of the present invention.

In one or more embodiments of the present invention, it may be desirable to account for short-scale, with respect to $L_x$ and $L_y$, shape changes, i.e., waviness, in the package surface. In one or more embodiments of the present invention, the base functions may be the natural modes of a rectangular plate of dimensions $L_x$ and $L_y$ with unconstrained edges, as shown in EQ. 11.

$$F_{mn}(x,y) = \cos\left[\frac{m\pi}{L_x}\left(\frac{L_x}{2}-x\right)\right]\cos\left[\frac{n\pi}{L_y}\left(\frac{L_y}{2}-y\right)\right] \quad (11)$$

With respect to EQ. 12 and EQ. 13, the indices m and n may be constrained.

$$m,n \in \{0,1,2,3,4\} \quad (12)$$

$$m+n \leq 4 \quad (13)$$

If only terms that satisfy EQ. 12 and EQ. 13 are retained, the first 15 terms of the series expansion are obtained. The set of shape coefficients are represented by the vector $a_{mn}$.

Figure 12:
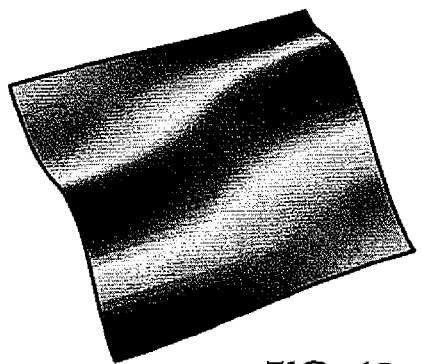
FIG. 12 shows an exemplary surface for illustrative purposes.
Figure 13:
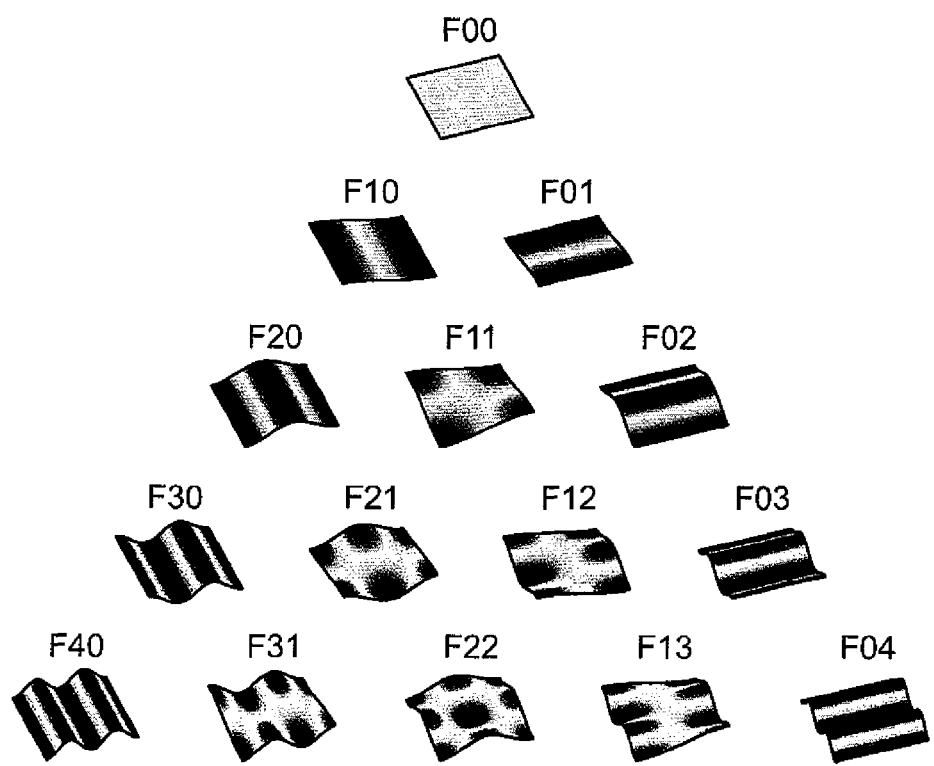
FIG. 13 shows surface maps of the first 15 base functions, which are the natural modes of a rectangular plate in this instance, used in a series expansion of the exemplary surface shown in FIG. 12.

For purposes of illustration, FIG. 12 shows an exemplary package surface. With reference to the exemplary package surface shown in FIG. 12, the shape coefficients, $a_{mn}$, represented by a 1×15 vector, $a=\{a_{00}, a_{10}, a_{01}, a_{20}, a_{11}, a_{02}, a_{30}, a_{21}, a_{12}, a_{03}, a_{40}, a_{31}, a_{22}, a_{13}, a_{04}\}$, would be $a=\{0, 0, 0, 0, 0.316, -0.707, 0, 0, 0, 0, 0, 0, 0, -0.632, 0\}$. FIG. 13 shows a topographic or contour map of the first 15 base functions used in the series expansion fit of the exemplary surface of FIG. 12.

In one or more embodiments of the present invention, it may be desirable to describe the surface shape of the package in terms of a target shape and the set of residual shape coefficients. With reference to EQ. 14, the residual surface is defined as the difference between the raw measurement data, z(x,y), and the targeted surface shape, $z_{target}(x,y)$.

$$res(x,y) = z(x,y) - z_{target}(x,y) \quad (14)$$

The residual shape coefficients could be defined by any of the embodiments previously discussed or any other method.

Advantages of one or more embodiments of the present invention may include one or more of the following.

In one or more embodiments of the present invention, a parameter set can be specified to uniquely describe the shape of any continuous surface.

In one or more embodiments of the present invention, the ability to communicate surface shape parameters to interested parties allows for tighter control of the surface shape and provide greater functionality and reliability.

In one or more embodiments of the present invention, surface shapes that have the same numerical warpage value, but significantly different shapes, can be distinguished.

In one or more embodiments of the present invention, the degrees of freedom or mechanical motion of the package may be determined.

In one or more embodiments of the present invention, the use of the surface shape parameters may improve system level simulations resulting in a model that more closely reflects and predicts the functionality and reliability of the realized system.

In one or more embodiments of the present invention, the surface shape parameters may be utilized to gain insight into the physics of failures related to the package.

In one or more embodiments of the present invention, the ability to communicate surface shape parameters to vendors of substrates enables tight control of the L2 interface.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method of quantifying a shape of a surface of a semiconductor die comprising:
   measuring an elevation (z) of the surface of the semiconductor die at a plurality of locations in an x-y plane of the surface comprising measurement data;
   performing a fit of the measurement data to a series expansion in terms of one or more base functions comprising a series expansion fit, wherein the base functions are generalized monomials;
   calculating a vector of shape coefficients from the series expansion fit;
   calculating, based on the vector of shape coefficients, intrinsic surface shape parameters $X_{sag}$ describing an effective bow along a x-axis, $Y_{sag}$ describing an effective bow along a v-axis, and Twist describing an elevation of a fourth corner with respect to a seating plane containing three other corners of a four corner surface; and
   outputting the intrinsic surface shape parameters.

2. The computer-implemented method of claim 1, wherein the surface of the semiconductor die is an electronic component, package, package substrate, PCB, bolster plate, lid also known as a heat spreader, heat sink, or connector also known as a socket.

3. The computer-implemented method of claim 1, wherein the base functions are natural modes of a rectangular plate with unconstrained edges.

4. A non-transitory computer readable medium comprising computer executable software instructions which, when executed by a processor, performs a method comprising:
   measuring an elevation (z) of a surface at a plurality of locations in an x-y plane of the surface comprising measurement data;
   performing a fit of the measurement data to a series expansion in terms of one or more base functions comprising a series expansion fit, wherein the base functions are generalized monomials;
   calculating a vector of shape coefficients from the series expansion fit;
   calculating, based on the vector of shape coefficients, intrinsic surface shape parameters $X_{sag}$ describing an effective bow along a x-axis, $Y_{sag}$ describing an effective bow along a v-axis, and Twist describing an elevation of a fourth corner with respect to a seating plane containing three other corners of a four corner surface; and
   outputting the intrinsic surface shape parameters.

5. The non-transitory computer readable medium of claim 4, wherein the surface of the semiconductor die is an electronic component, package, package substrate, PCB, bolster plate, lid also known as a heat spreader, heat sink, or connector also known as a socket.

6. The non-transitory computer readable medium of claim 4, wherein the base functions are natural modes of a rectangular plate with unconstrained edges.

7. A computer-implemented method of quantifying a shape of a surface of a semiconductor die comprising:
   identifying a target shape for the surface;
   measuring the elevation (z) of the surface of the semiconductor die at a plurality of locations in the x-y plane of the surface comprising measurement data;
   defining a residual surface as the difference between the measurement data and the target surface;
   performing a fit of the residual surface to a series expansion in terms of one or more base functions comprising a series expansion fit, wherein the base functions are generalized monomials;
   calculating a vector of shape coefficients from the series expansion fit;
   calculating, based on the vector of shape coefficients, intrinsic surface shape parameters $X_{sag}$ describing an effective bow along a x-axis, $Y_{sag}$ an effective bow along a v-axis, and Twist describing an elevation of a fourth corner with respect to a seating plane containing three other corners of a four corner surface; and
   outputting the intrinsic surface shape parameters.

8. The computer-implemented method of claim 7, wherein the surface of the semiconductor die is an electronic component, package, package substrate, PCB, bolster plate, lid also known as a heat spreader, heat sink, or connector also known as a socket.

9. The computer-implemented method of claim 7, wherein the base functions natural modes of a rectangular plate with unconstrained edges.

* * * * *